United States Patent [19]

Hogseth et al.

[11] 4,302,172

[45] Nov. 24, 1981

[54] EXTRUSION DIE ASSEMBLY

[75] Inventors: Steven W. Hogseth; Carl W. Loff; Dean J. White, all of Chippewa Falls, Wis.

[73] Assignee: Leesona Corporation, Warwick, R.I.

[21] Appl. No.: 150,234

[22] Filed: May 15, 1980

[51] Int. Cl.$^3$ ............................................. B29F 3/00
[52] U.S. Cl. ................................ 425/154; 425/141; 425/145; 425/185; 425/192 R; 425/376 A; 425/381; 425/461; 425/466
[58] Field of Search .............. 425/461, 466, 141, 145, 425/151, 190, 192 R, 376 A, 376 R, DIG. 109, 154, 185, 381

[56] References Cited

U.S. PATENT DOCUMENTS 3,096,543  7/1963  Konopacke et al. .............. 425/466
3,264,686  8/1966  Soloduk ............................ 425/466
3,859,032  1/1975  Krupa ............................... 425/376 A Primary Examiner—Jeffery R. Thurlow
Attorney, Agent, or Firm—Robert J. Doherty

[57] ABSTRACT

An adjustment mechanism for a restrictor bar in a die construction of the type in which such restrictor bar is movable into and out of the internal flow path of the die so as to regulate extrusion of material therefrom. The restrictor bar movement is in axial direction and is accomplished by means of axially restrained, rotatable spools connected to threaded ends of studs in turn extending through the die body and fixedly attached to the restrictor bar. Each of the spools includes a breakable segment to cause the spools to break prior to possible stud overstressing. The spools or portions thereof may be easily replaced at a position located outside of the die and accordingly eliminates die down time.

7 Claims, 4 Drawing Figures

EXTRUSION DIE ASSEMBLY

BACKGROUND SUMMARY OF THE INVENTION

The present invention relates to a slot type extrusion die for the extrusion of thermoplastic sheet, film, strand, strip, etc. Such extrusion dies are presently known and generally include an entrance for the extrudate into the die itself, a manifold area for the distribution of the thermoplastic material within the die and an exit slot or slots whereby the ultimate shape of the material is determined as it emerges from the die. With such die constructions, it is generally necessary to equalize the pressure drop through the die so as to insure that an equal amount of material is delivered along the full width thereof. Such pressure equalization may be accomplished by the use of an adjustable restrictor bar generally extending laterally across the extent of the flow channel and movable into and out of the flow path thereof so as to form in effect an adjustable valve mechanism to create various differential pressure drops across the internal flow path of the die as needed to effect the desired shape of the material extruded. Generally dies of the above described construction include a plurality of elongated studs fixedly connected to the restrictor bar at spaced locations therealong. These studs are axially positioned through the die body and terminate in threaded outer ends which extend beyond the die body itself. Accordingly, various systems have been devised to rotationally engage the outer ends of the studs with some axially restrained member such as a nut and in this way cause the studs to axially move with respect to the die body and accordingly facilitate the required adjustment of the restrictor bar in turn connected thereto. Accordingly, progressive rotation of the nut devices about their respective studs in opposite directions effects the necessary forward and rearward movement to the restrictor bar necessary for the required material flow adjustment. However, with such systems, rotational overstressing of the stud via the nut device can cause the stud to break. Stud breakage is particularly undesirable if it occurs internally of the die, e.g. at its connection point with the restrictor bar since such breakage would require at least partial disassembly of the die and interruption of its production time. Accordingly, it would be desirable that any such stud breakge occur at a location outside of the die so that the broken end would be readily accessible and thus more easily removed without the necessity of shutting down the die. A construction designed for such purposes is disclosed in U.S. Pat. No. 3,859,032 issued Jan. 7, 1975, and includes a weakened stud portion at which any breakage would occur. Such construction and its operational systems, however, requires rotationally disconnecting the broken stud segments from the restrictor bar which in many cases is difficult to achieve. Accordingly, it would be further desirable to be able to operationally interrupt the application of rotational force to the stud at a point prior to which the stud itself is broken and thus simultaneously eliminate the cost associated with stud replacement and the often extensive labor factor in removing broken studs from the die body. The above art discussion and patent citation constitutes applicant's Prior Art Statement and a copy of the cited patent is thus enclosed with this application.

This and other objects of the present invention are accomplished by the use of a stud adjustment assembly including spools adapted for engagement with the threaded stud ends which extend outside of the die body. Each of the spools includes a threaded axial bore adapted for engagement with the stud and including means breakable upon rotational overstressing thereof so as to prevent further force application to its respective stud. In this manner, the fully accessible spools are replaced rather than the adjustment studs or other more time consuming element.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE INVENTION

Figure 1:
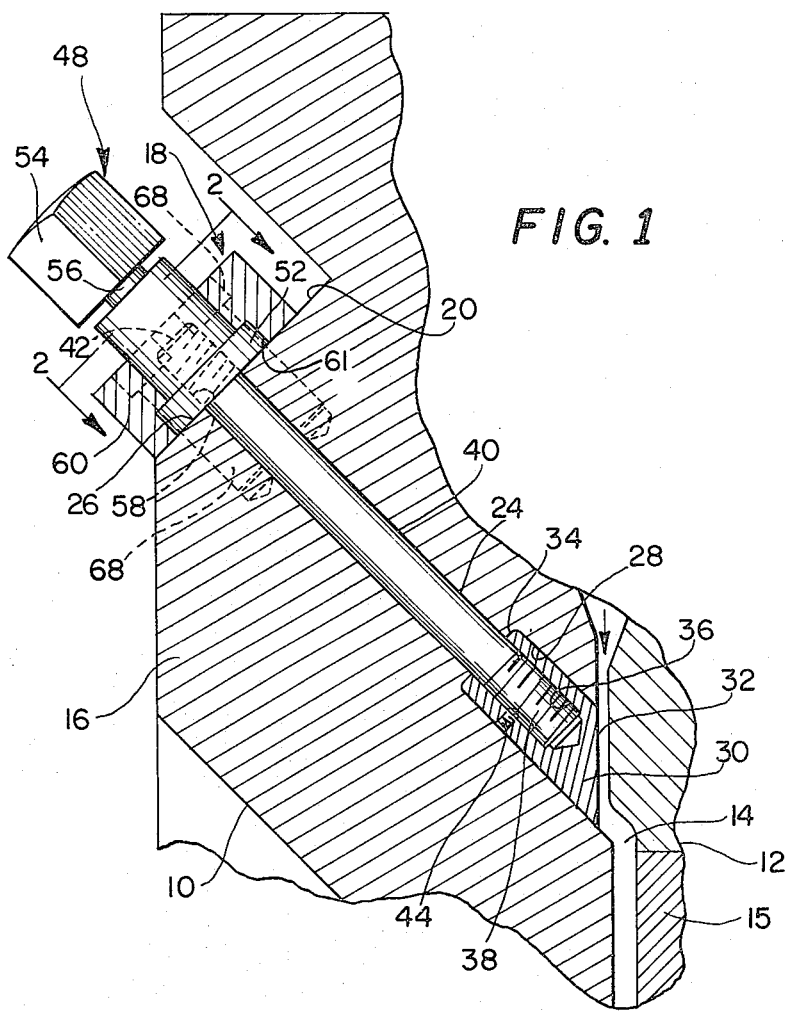
FIG. 1 is a sectional view of a portion of a die including the restrictor bar adjustment assembly of the present invention.

Referring to the drawing and more particularly FIG. 1 thereof, a schematic illustration of a portion of opposed die halves 10 and 12 which cooperatively form a material flow channel 14 therebetween is shown. Material such as thermoplastic resin passes through the flow channel 14 in the direction shown by the arrow. The die may include separate segments such as segment 15. The die half 10 includes a body 16 having an elongated recess 18. Such recess is essentially formed by a flat base wall 20. A series of axially extending laterally spaced smooth wall bores 24 extend through the die body 16 and terminate in openings in the base wall 20 at one end thereof and in an enlarged bore at the other end thereof which in turn is in communication with the flow channel 14. An elongated restrictor bar 30 is housed within the enlarged bore 28 and includes a face wall 32 which is adapted to form a part of the flow channel 14 and to move forwardly and rearwardly with respect thereto so as to increase or decrease the flow channel area in that particular location thereof along the lateral extent thereof.

The other end of the bar 30 terminates in a wall 34 in turn provided with a plurality of laterally threaded spaced openings 36. The threaded openings 36 are in turn adapted to receive threaded lower ends 38 of adjusting studs 40. The other ends of the adjusting studs extend outwardly of the openings 26 and the recess 18 and are further threaded at such other outer end 42. The lower inner end 38 of the studs 40 are threadably engaged with the restrictor bar 30 and fixedly held in position against further relative rotation with respect thereto by a set screw 44. Other conventional means for fixedly attaching the inner ends of the studs 40 to the restrictive bar may however, be utilized.

Figure 3:
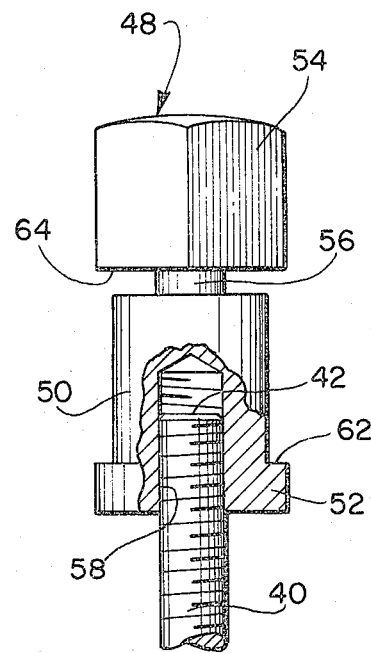
FIG. 3 is an elevational view of the spool construction shown in FIGS. 1 and 2 with parts broken away and sectioned for clarity.
Figure 2:
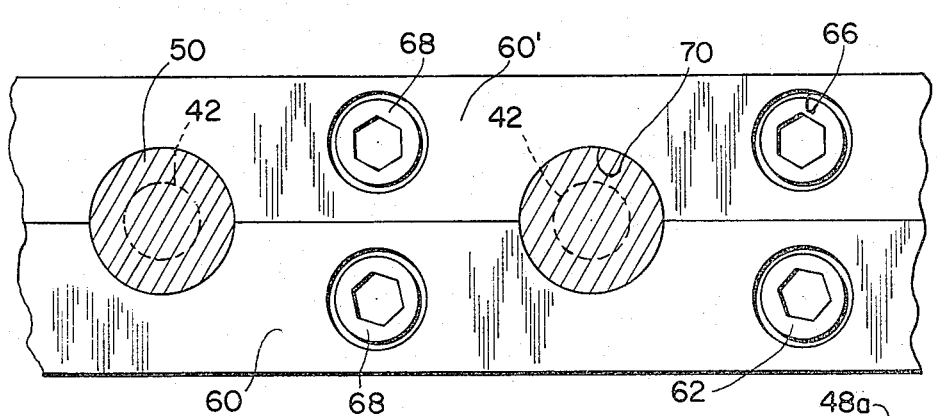
FIG. 2 is a sectional view taken along the line 2—2 of FIG. 1.

The novel feature of the present invention relates to an assembly engaged with the threaded ends 42 of the studs 40 in such a manner so as to effect axial, non-rotational movement to such studs and accordingly accomplish the desired adjustment of the restrictor bar 30. Such assembly is axially restrained with respect to the die body 16 but is permitted rotational movement so as to force the studs 40 forwardly or rearwardly dependent on the rotational movement of the assembly. In addition, the assembly includes means which are breakable upon rotational overstressing of the threaded connection between the assembly and a threaded stud end 42 such that a portion of the assembly breaks well prior to imparting a force which could eventually lead to breakage of the stud or its connection with the restrictor bar. Such adjusting assembly includes a plurality of spools 48. The spools 48 are in turn each adapted for engagement with and mounting over the projecting portions of the threaded outer stud ends 42. Turning now to FIG. 3, the construction of the spools 48 is most apparent as including a body 50, a bottom outwardly extending flange 52 and an upper geometrically configured head 54. The head 54 is in turn connected to the body 50 by means of a reduced thickness connecting portion 56, i.e., the body 50 is significantly notched at that area so as to reduce its connecting strength with the head 54. By reason of its geometric configuration, the head 54 is utilized to rotate the spool 48; however, other means for rotating the spool may also be provided in the head 54. Generally the spool is made from hexagonal stock which is turned down to form a circular body and connecting portion 50 and 56 respectively.

The spool body 50 is provided with an axially threaded bore 58 which opens through the flange 52 and extends upwardly into the body and terminates at a point removed from the head 54 thereof. The spool is adapted to extend over the threaded upper end 42 of the stud, that is, the stud is threadably received within the bore 58. In this regard, the flange 52 is adapted for seating upon the recess wall 20. The flange 52 is generally hexagonal but may be any shape so long as it permits rotational movement with respect to bars which hold it in place. In order to axially restrain the spool 48 with respect to the die body 16, a pair of opposed elongated bars 60 and 60' are adapted to extend between the flange 52 and the head 54 of one or more of the spools 48 depending on the elongated extent of the bars 60, 60', that is, the bars may in effect capture one or more spools 48. In this regard the bars 60, 60' are adapted to contact the outer surface of the circular body 50 and include a lower recess 61 in which the flange 52 is adapted to extend and be held against the recess 20 by means of shoulder contact upon the flange. The bars 60', 60 thus restrain the spool 48 from axial movement via its above described contact with the shoulders 62 of the flange 52. The bars are provided with suitable openings 66 through which bolts 68 may extend into the body of the die so as to fixedly attach the bars thereto. In addition the bars are provided with rounded notches 70 to facilitate the shape of the circular body portions 50 of the individual spools 48.

Upon operation of the device, the spools 48 are rotated as by the application of a wrench to the head 54 thereof in the desired rotational direction. Such force causes the spool 48 to rotate within the above described confines which in turn causes the stud associated therewith to axially move via its threaded connection between the threaded end 42 thereof and the threaded bore 58 of the spool. Such turning causes a portion of the restrictor bar controlled by the particular moving stud to be forced forwardly or rearwardly with respect to the flow channel 14 in the desired fashion. The reduced thickness connection 56 between the head 54 and the body 50 is calibrated such that it will shear upon the application of a force approaching that which could damage the stud 40 or its connection with the restrictor bar 30. Upon such shearing, that particular spool may simply be replaced by the disconnection of the particular portions of the bars 60 and 60' and the removal of the remaining threaded section of the body portion 50 of the spool from the threaded outer end 42 of the stud. In this regard the flange 52 may be contacted by a wrench for such removal purpose. Alternatively, the broken outer end of the body may simply be gripped as with vise grips and removed by twisting. It should be understood that regardless how the broken spool section is removed, the stud 40 remains fixedly attached to the restrictor bar and accordingly cannot rotate.

Figure 4:
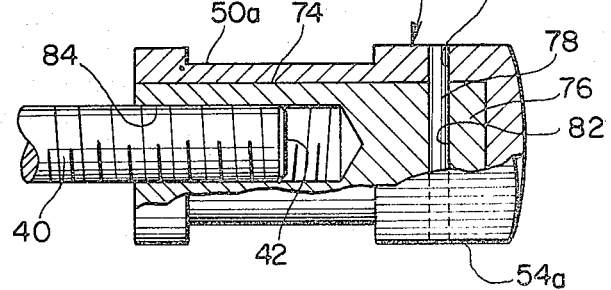
FIG. 4 is an elevational view similar to FIG. 3 but showing an alternate spool construction.

Turning now to FIG. 4, an alternative spool construction 48a is shown. In such alternate construction, a smooth walled axial bore 74 is provided through the body 50a and extends upwardly into the head 54a. An insert 76 is positioned in such bore 74 and is fastened therein by means of a pin 78 extending through the head 54a via a bore 80 therethrough. The forward end of the insert is also provided with a bore 82 such that alignment of the bores 80 and 82 facilitates the insertion of the pin 78 therethrough. The lower end of the insert 76 is provided with the axially threaded bore 84 corresponding to the threaded bore 58 in the previous embodiment. The strength of the pin 78 is calibrated so as to break prior to overstressing the stud 40 or its connection to the restrictor bar. Upon breakage of the pin 78, the broken portions of the pin may be simply punched out and a new pin reinserted.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An extrusion die for the extrusion of thermoplastic materials having a die body defining an internal plastic flow channel and an elongated restrictor bar mounted generally transversely of said channel, said bar including a plurality of elongated studs fixedly connected at one end thereof to said bar at spaced longitudinal positions therealong, said studs extending from said bar through said die body to a position where the other ends thereof are positioned outwardly of said body, said other stud ends being threaded; the improvement comprising an assembly for non-rotatably, axially moving said studs relative to said die body so as to alternatively move said bar back and forth with respect to said flow path so as to regulate the flow of material therethrough, said assembly including an elongated recess disposed in the outer surface of said body and through which said other stud ends are adapted to extend, a plurality of spools each adapted for engagement with one of said other stud ends, each of said spools including a body portion in turn provided with a threaded axial bore engaged with said threaded other stud ends, means for axially restraining said spools with respect to said die body while permitting rotation thereof so as to in turn effect said axial movement of said studs, each of said spools including means breakable upon rotational overstressing thereof so as to prevent further application of force to its respective stud.

2. The apparatus of claim 1, each of said spools including an upper head including means for rotating said spool and a central body portion, said breakable means being a reduced thickness connection between said central body portion and said head.

3. The apparatus of claim 2, said spools being entirely replaceable upon breakage of said breakable means.

4. The apparatus of claim 2, said spool threaded bore axially extending from said body to a point short of said reduced thickness connection.

5. The apparatus of claim 1, each of said spools including an upper head in turn having means for rotating said spool and a central body portion, a bore extending into said body portion and terminating in said upper head, a sleeve positioned in said bore, said threaded axial bore positioned in said sleeve and a pin for connecting said sleeve to said spool.

6. The apparatus of claim 5, said sleeve and said head each having a pin bore extending therethrough said pin bores adapted for alignment with each other and said pin adapted for positioning in said aligned pin bores so as to transmit force from said spool head to said stud.

7. The apparatus of claim 2 or 5, said spools including a lower flange adapted for contact with said die body recess, and a pair of clamp bars adapted for disposition on opposite sides of one or more of said spools, said bars adapted to engage opposite sides of said lower flange so as to hold said spools from axial movement with respect to said die body.

* * * * *